Sept. 7, 1954     R. R. CROOKSTON     2,688,386
DEVICE FOR ADJUSTING BRAKES AUTOMATICALLY
Filed Jan. 23, 1951     3 Sheets-Sheet 1
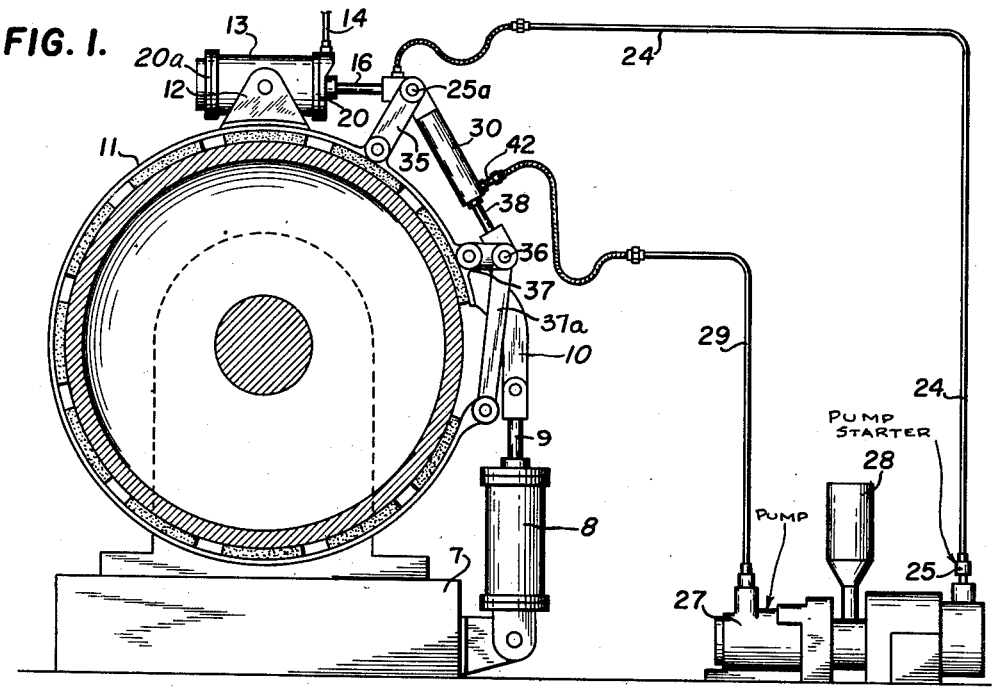
FIG. 1.
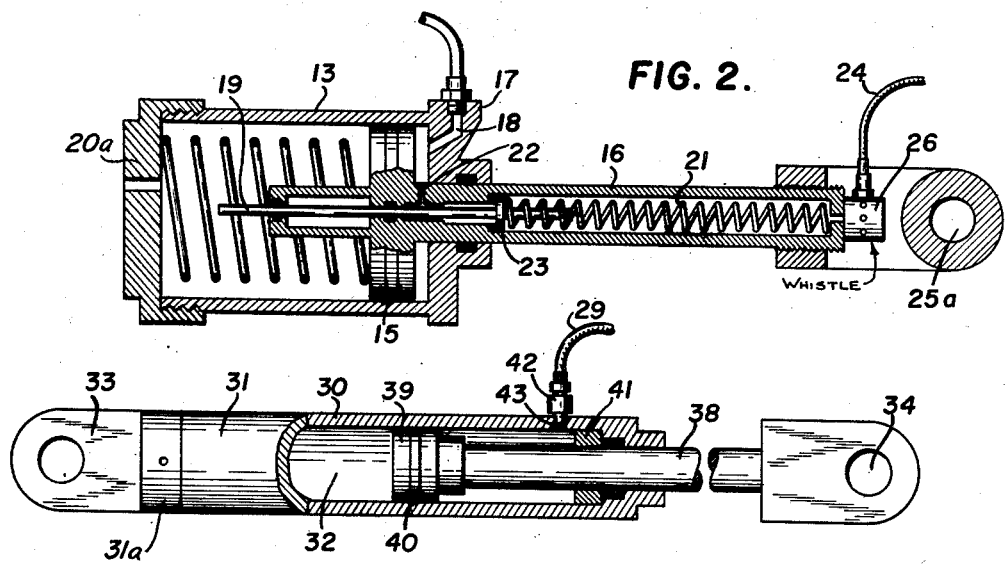
FIG. 2.
FIG. 3.
INVENTOR.
Robert R. Crookston,
BY
AGENT.

Sept. 7, 1954   R. R. CROOKSTON   2,688,386
DEVICE FOR ADJUSTING BRAKES AUTOMATICALLY
Filed Jan. 23, 1951   3 Sheets-Sheet 2

INVENTOR.
Robert R. Crookston,
BY
AGENT.

Sept. 7, 1954  R. R. CROOKSTON  2,688,386
DEVICE FOR ADJUSTING BRAKES AUTOMATICALLY
Filed Jan. 23, 1951  3 Sheets-Sheet 3
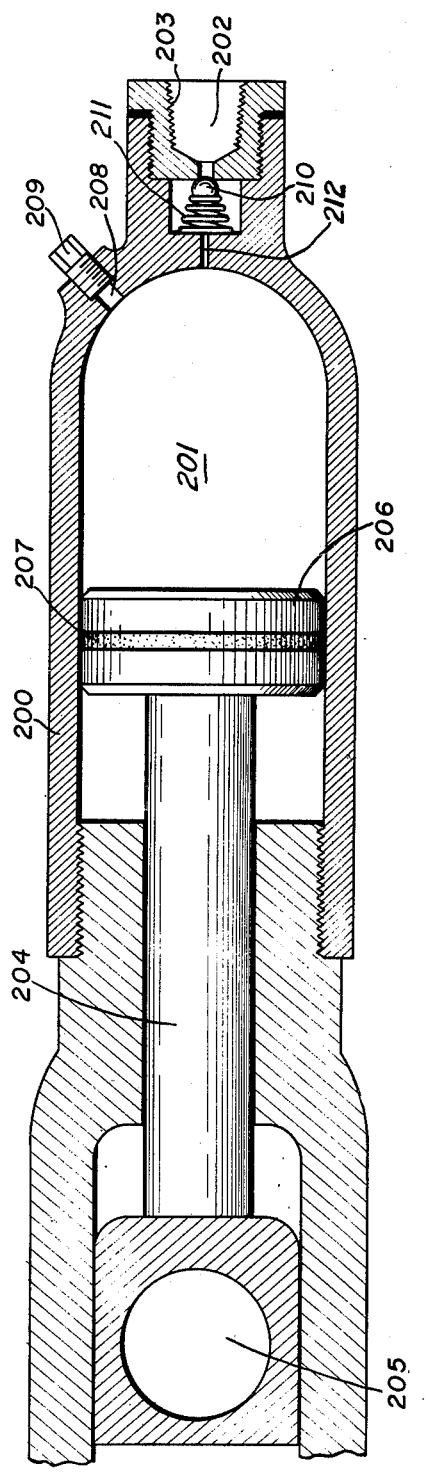
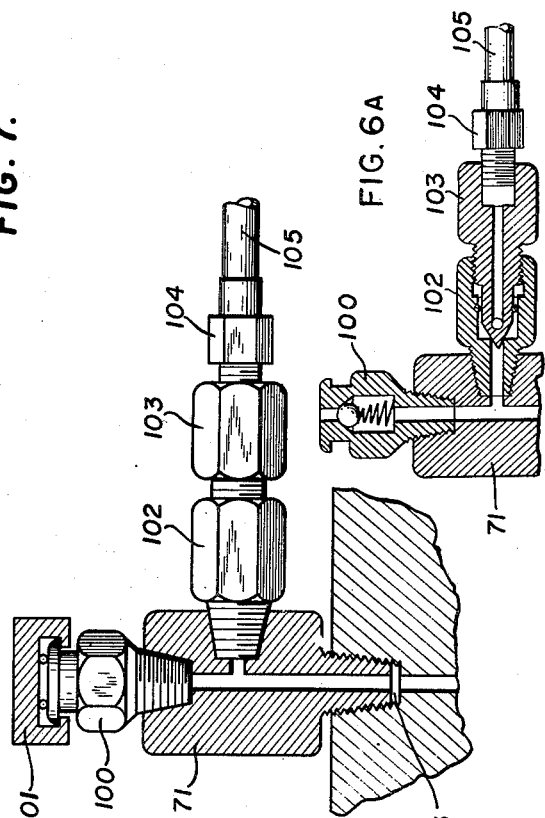
*INVENTOR.*
Robert R. Crookston,
BY
*AGENT*

Patented Sept. 7, 1954

2,688,386

UNITED STATES PATENT OFFICE 2,688,386

DEVICE FOR ADJUSTING BRAKES AUTOMATICALLY

Robert R. Crookston, Houston, Tex., assignor, by mesne assignments, to Standard Oil Development Company, Elizabeth, N. J., a corporation of Delaware Application January 23, 1951, Serial No. 207,360

3 Claims. (Cl. 188—196)

1

The present invention is directed to apparatus for adjusting the relationship of one element with respect to another element. More particularly, the invention is directed to a take-up assembly for adjusting brakes, such as those applied on rotary drilling drawworks. The invention also has to do with a combination for adjusting brake assemblies automatically.

The apparatus for adjusting brakes automatically comprises, in combination, an air brake cylinder provided with means for releasing air pressure therefrom into a conduit on overtravel of a piston arm in said cylinder. A pump having a starting means connected to said conduit and adapted to be actuated by flow of air from the cylinder is fluidly connected to a fluid reservoir and is provided with a discharge conduit. A take-up assembly comprising a housing is connected to the injection means therein to deliver fluid thereto from the pump. The first attaching means connects said longitudinal member to the piston and a second attaching means connects the take-up assembly to the brakes.

The invention will be further described by reference to the drawing in which

Figure 1 is an embodiment of the combination apparatus showing its relationship to a brake assembly;

Figure 2 is a detailed view of an air brake assembly for releasing air pressure on overtravel of a piston arm;

Figure 3 is a simplified cutaway view of a take-up assembly of Figure 1;

Figure 6 is a detail of the injection means of Figs. 1 to 5; Fig. 6a is a sectional detailed view of Fig. 6; and Figure 7 is a sectional view of another embodiment of the take-up assembly in accordance with the present invention.

In the several figures of the drawing identical parts will be designated by identical numerals.

Figure 4:
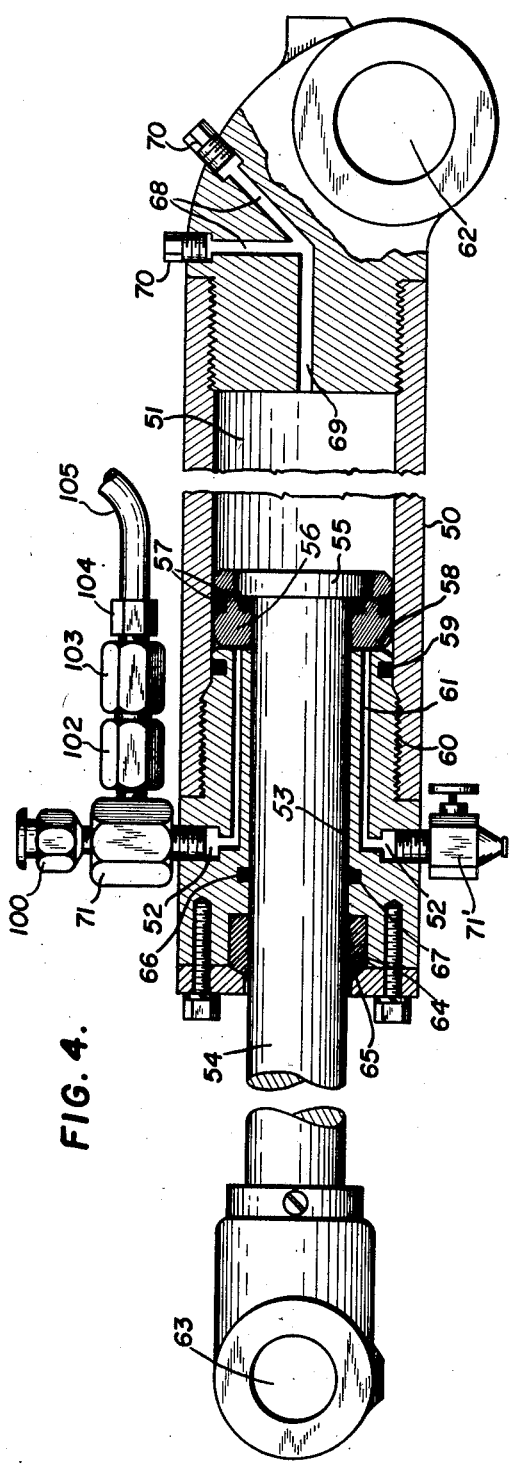
Figure 4 is a sectional view in detail of a take-up assembly.

The present invention is preferably employed with air operated brakes on drawworks such as described in my prior Patents Nos. 2,589,059 and 2,489,449.

Referring now to the drawing and particularly to Figs. 1 and 2, numeral 11 designates a brake band assembly such as described in aforementioned patents to Crookston, supra. Mounted on the brake band assembly and attached thereto by attaching means 12 is an air brake cylinder 13 which is shown more clearly in Fig. 2. Air brake assembly 13 is provided with a piston 15 to which is attached a piston rod 16. Conduit 14

2 is attached to inlet 17 which defines a passageway 18 allowing air pressure to be exerted against the piston 15 to move it to the left. Piston 15 and piston arm or rod 16 are provided with a slidable arm 19 arranged therein which is designed to strike against the cylinder head 20a opposite to cylinder head 20 of cylinder 13 on overstroking or overtravel of the piston arm. This may be due to slippage or wear of the brake band assembly 11 on practically continual application thereof. On actuation of the rod 19, it is caused to compress the compression means 21 which allows air to by-pass through the channel 22 defined by the arm 16 and then into the passageway within the arm 16 by virtue of the unseating of the element 23 carried by rod 19. The passage of air through the piston arm 16 allows air to be directed into conduit 24 and thence to pump starter 25. The piston arm 16 is suitably connected by a connection means 25a to a take-up assembly which will be described in more detail hereinafter. The air brake cylinder 13 and piston arm 16 embody a warning whistle or device 26 which may a siren or any other type of warning signal. This latter assembly has been described and claimed in patent application Serial No. 159,170, filed May 1, 1950, for Robert R. Crookston, now U. S. Patent No. 2,632,420.

In the device of the present invention, it may be desirable to omit the warning device 26 and simply to have the conduit 24 connected to the piston arm 16 as shown. In any event, the conduit 24 allows air pressure thus transmitted against pump starter 25 which may be an electrical switch to energize a suitable pump 27 or the pump starter 25 may start an air compressor which could be used in lieu of the pump 27. Connected to the pump 27 or compressor, as the case may be, is a fluid reservoir 28 in which may be provided a body of a mobile fluid, such as grease used in lubricating bearings and the like, or a mineral oil or other hydraulic fluid, such as silicone fluid. Pump 27 delivers the grease or other fluid through line 29 into brake take-up assembly 30 which is generally shown in Fig. 1 and which will be described in more detail in Figs. 3, 4, 5 and 7.

Referring now to Figs. 1 and 3, it will be seen that take-up assembly 30 comprises a housing 31 defining a chamber 32. Housing 31 is provided with attaching means 33 and 34 which allows the assembly 30 to be suitably attached to connecting means 25a including linkage 35 and to connecting means 36 including linkage 37 and connecting arm 37a which serve to connect the assembly to the brake band assembly 11. The brake band assembly 11 has a connecting arm 10 attached to a piston rod 9 which, in turn, is attached to a piston, not shown, arranged in piston cylinder 8. Piston cylinder 8 is attached to the supporting member 7 of the brake assembly 11. The piston cylinder 8 is provided with means, not shown, for operating the brake assembly 11.

Referring now to Fig. 3, it will be seen that chamber 32 has arranged therein a longitudinal member 38 which defines a piston 39 provided with a ring sealing member 40 which suitably may be an O-ring. Cylinder 32 is provided with a stop means 41 which is adapted to contact the piston 39 on longitudinal member 38. The housing 30 is provided with an injection means 42 which fluidly communicates with a port 43 defined by housing 31. Injection means 42 is connected to conduit 29 and allows delivery of fluid from pump 27 into the chamber 32. It is to be noted that cylinder head 20a is threadably attached to the cylinder 13 to allow ready access to the interior of cylinder 13. Also, the cylinder 31 has a removable threaded end 31a to allow access to the movable parts in cylinder 31.

Referring now to Fig. 4, a housing 50 defines a chamber 51 provided with ports 52. Arranged in a passageway 53 defined by housing 50 is a longitudinal member 54 which defines with an end thereof a shoulder 55. Embracing and surrounding the shoulder 55 is an annular piston member 56 provided with annular sealing means 57. The piston member 56 abuts against a seat 58 which is also provided with an annular sealing member 59. The seat 58 may be made integral with the housing 50 although, in the present embodiment, it is shown threadably connected thereto by threads 60. The ports 52 communicate by means of passageways 61 with the face of the piston 56 which abuts against the seat 58.

The housing 50 is provided with a connecting or attaching means 62 while the longitudinal member 54 is similarly provided with an attaching means 63. These attaching means may be attached to a manually operated brake to cause adjustment thereof. The seat assembly 58 defines an annular recess 64 in which is arranged a suitable wiper material 65. The seat assembly 58 is also provided with an annular recess 66 in which is arranged an annular sealing ring 67. As stated before, the assembly 58 defining the seat may be made integral with the housing 50.

The attaching means 62 may be suitably constructed to define inlets 68 which join and communicate by passageway 69 with chamber 51. These inlets are suitably closed by caps 70 but may be used by removing the caps to inject air into chamber 51 and to cause release or rejection of fluid from between the faces of seat 58 and piston 56 as will be described further. Threadably connected to one port 52 is injection means 71 which is shown in more detail in Figs. 6 and 6A. At least one of these injection means is connected to conduit 29 as shown in Figs. 1 and 3. Attached to the other port 52 is bleeder valve 71'.

Figure 5:
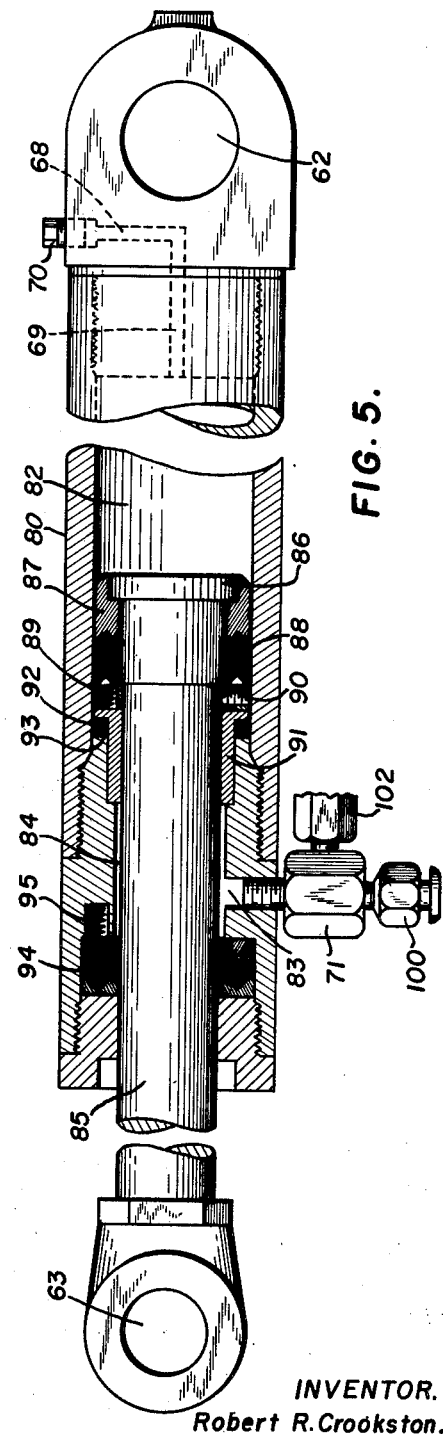
Figure 5 is a sectional view of another embodiment of the take-up assembly.

Referring now to Fig. 5, which shows a modification of the apparatus of Fig. 3, a housing 80 defines a chamber 82 and a port 83 into which is threadably connected an injection means 71 similar to that employed in the embodiment of Fig. 4. The housing 80 defines a passageway 84 in which is arranged a longitudinal member 85 which projects into chamber 82 and defines a shoulder 86. Embracing shoulder 86 is a metallic annular member 87 which may be composed of Babbitt metal and the like which is formed to receive a packing means such as V-packing 88; abutting against packing 88 is a plurality of springs 89. A plurality of set screws 90 are provided to maintain the springs 89 in position against the packing 88. A second annular member 91 engages the springs and packing assembly and defines therewith and the first annular member a piston element which abuts against an annular packing member 92 which, in turn, rests against a shoulder 93 defined by the housing 80.

A second packing assembly 94 provided with springs 95 seals the longitudinal member 85 into the housing 80. The longtiudinal member 85 like the longitudinal member 54 in Fig. 4 is provided with an attaching means 63 while the housing 80 is provided similarly with an attaching means 62. The attaching means 62 defines an inlet 68 which communicates by line 69 with the chamber 82. The inlet 68 may suitably be closed by a closure means 70.

In Figs. 6 and 6a a detail is given of the injection means 71 which is threadably connected to port 43, 52, or 83 as the case may be. Injection means 71 includes a button head grease fitting 100 which has within its body a one-way check valve and defines a restricting annulus to prevent reverse flow. This fitting may be used for both manual and automatic filling of the take-up assembly with fluid. Cap 101 is an additional safety seal which is installed after manual injection of fluid. Elements 102, 103, and 104 comprise a bleeder assembly which may include a conventional needle valve for releasing grease or other fluid into hose 105 by rotating member 103 to open valve 102 when the take-up assembly is loosened or let out such as when brakes are let out.

When a take-up assembly is employed as in Figs. 1-3, and 5 the conduit 29 connects into fitting 100 via a threaded connection not shown in fitting 100. It is to be understood that fitting 100 may be replaced by any conventional grease fitting such as a "Zerk" or "Alemite" fitting provided a positive shut-off element such as a needle valve in series with it is employed between the fitting and the take-up assembly.

Referring now to Fig. 7, a still further embodiment of my invention is shown in which a housing 200 defines a chamber 201 provided with a port 202 which is threaded with threads 203 to receive an injection means such as 71 shown in the preceding figures. Arranged in chamber 201 is a longitudinal member 204 which is suitably connected by attaching means 205 to an element whose position may be adjusted with respect to another element. Longitudinal member 204 defines a piston 206 which is provided with an annular sealing member 207. Housing 200 defines a second port 208 which is provided with a closure 209. The port 202 is provided with a check valve mechanism comprising a spherical member 210 and a spring 211. Port 202 is adapted to receive, as stated before, an injection means and to inject under pressure a suitable fluid. Pressure exerted on the spherical member 210 and tension means 211 allows fluid to be injected into chamber 201 by orifice 212. Port 208 is a bleeding passage for emptying the chamber 201.

In operating the device of the present invention, it will be assumed that an assembly such as that shown in Fig. 1 will be employed and that overstroking of piston arm 16 has resulted due to the wear on brake band assembly 11 causing the longitudinal member 38 to become unduly loosened. When this happens, the over-travel device which is an element of this combination causes air to be released to the starter 25 which actuates pump 27 causing fluid to be pumped into take-up assembly 30. As this happens, the fluid bears against the piston 39 causing the arm 38 to be moved into the cylinder and thus causing tightening of the brake band assembly 11.

The embodiments of Figs. 4 and 5 work in a similar manner. Assuming that injection means 71 are connected to the conduit 29, grease or other mobile fluid would be introduced with reference to Fig. 4 through the port 52 into passageway 61 to the space between piston 56 and shoulder 58 which will cause longitudinal arm 54 to move to the right causing tightening up on the connecting means 63. The apparatus of Fig. 5 works in a similar manner to that of Fig. 4, grease or other fluid being introduced by injection means 71 and to port 83 causing the grease or the mobile fluid to be exerted against the piston assembly defined by the elements 91, 89 and 87 as well as shoulder 86. This causes the rod 85 to move to the right tightening up on the connecting means 63.

The apparatus of Fig. 7 operates in a slightly different manner, the grease or fluid being introduced through port 202 and orifice 211 into chamber 201 which causes the arm 204 to move to the left which may cause tightening up or loosening of the assembly, as the case may be.

When it is desired to loosen the connections, this may be accomplished by bleeding out the required amount of fluid, such as grease, by releasing to the atmosphere. In the embodiment of Fig. 4, the grease connections 71 may be removed from one of the ports 52 for discharge of fluid therefrom. In Fig. 5, the injection means 71 may be disconnected from port 83, allowing release of fluid. Caps 70 are removed from inlets 68 and air is admitted into passageways 69 to cause extrusion of the grease by force exerted against the pistons 86, 87 and 55, 56. In Fig. 7 a drain plug 209 is removed from port 208 which allows the grease or fluid to be discharged.

The nature and objects of the present invention having been fully described and illustrated, what I wish to claim as new and useful and to secure by Letters Patent is:

1. Apparatus for adjusting brakes automatically which comprises, in combination, an air brake cylinder having a piston arranged therein, pressure releasing means including a piston arm connected to said piston, means for releasing air pressure from said cylinder on overtravel of said piston in said cylinder, a conduit connected to said pressure releasing means, a pump having a starting means connected to said conduit adapted to be actuated by flow of air from said cylinder, a fluid reservoir fluidly connected to said pump, a discharge conduit from said pump, a take-up assembly comprising a housing defining a chamber provided with a seating member, and at least a port in fluid communication therewith, a longitudinal member defining a shoulder with a first end thereof slidably arranged in and projecting into said chamber, said shoulder being adapted to seat on said seating member, injection means mounted on said housing fluidly communicating with said port for directing a fluid medium against said shoulder to cause uni-directional movement of said member, said discharge conduit being connected to said injection means to deliver fluid thereto from said pump, first attaching means adapted for connecting said longitudinal member to said brakes and second attaching means connecting said take-up assembly to said piston arm.

2. Apparatus for adjusting brakes automatically which comprises, in combination, an air brake cylinder having a piston arranged therein, pressure releasing means including a first piston arm connected to said piston, means for releasing air pressure from said cylinder on overtravel of said first piston in said cylinder, a conduit connected to said pressure releasing means, a pump having a starting means connected to said conduit adapted to be actuated by flow of air from said cylinder, a fluid reservoir fluidly connected to said pump, a discharge conduit from said pump and a take-up assembly comprising a piston cylinder having a second piston arm arranged slidably therein provided with a first attaching means on a free end of said second arm and a second attaching means on said piston cylinder, said piston cylinder being provided with means for injecting fluid thereinto, said discharge conduit being connected to said injection means to deliver fluid into said piston cylinder from said pump and said first attaching means being adapted for connection to said brakes and said second attaching means being connected to said first piston arm.

3. Apparatus for adjusting brakes automatically which comprises, in combination, an air brake cylinder having a first piston arranged therein, pressure releasing means including a piston arm connected to said first piston for releasing air pressure from said cylinder on overtravel of said first piston in said cylinder, a conduit connected to said pressure releasing means, pumping means having a starting means connected to said conduit adapted to be actuated by flow of air from said cylinder, a fluid reservoir fluidly connected to said pumping means, a discharge conduit from said pumping means, a hydraulic take-up assembly including a piston cylinder provided with a second piston having a longitudinal arm projecting from said piston cylinder and means on said piston cylinder for injecting a fluid medium into said piston cylinder against said second piston to cause uni-directional movement of said longitudinal arm, said discharge conduit being connected to said injection means to deliver fluid thereto from said pumping means, first attaching means adapted for connecting said longitudinal arm to said brakes and second attaching means connecting said take-up assembly to said piston arm.

References Cited in the file of this patent

UNITED STATES PATENTS

| Number | Name | Date |
| --- | --- | --- |
| 697,140 | Goldschmidt | Apr. 8, 1902 |
| 1,673,528 | Pigeolet | June 12, 1928 |
| 2,048,472 | Sanford | July 21, 1936 |
| 2,110,098 | Strecker | Mar. 1, 1938 |
| 2,168,654 | Olson et al. | Aug. 8, 1939 |
| 2,168,818 | Condon | Aug. 8, 1939 |
| 2,251,379 | van der Hof | Aug. 5, 1941 |
| 2,489,449 | Crookston | Nov. 29, 1949 |
| 2,515,274 | Stevenson | July 18, 1950 |

FOREIGN PATENTS

| Number | Country | Date |
| --- | --- | --- |
| 648,027 | Germany | July 20, 1937 |